United States Patent

Riyaz (10) Patent No.: US 12,106,308 B2
(45) Date of Patent: Oct. 1, 2024

(54) AUXILIARY BATTERY POWER AUTHENTICATION SYSTEM FOR USE WITH AN EMV CONTACTLESS SECURE TRANSACTION CARD

(71) Applicant: Bank of America Corporation, Charlotte, NC (US)

(72) Inventor: Sowdagar Riyaz, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 34 days.

(21) Appl. No.: 17/860,162

(22) Filed: Jul. 8, 2022

(65) Prior Publication Data
US 2024/0013222 A1    Jan. 11, 2024

(51) Int. Cl.
| | |
|---|---|
| *G06Q 20/40* | (2012.01) |
| *G06K 19/04* | (2006.01) |
| *G06K 19/07* | (2006.01) |
| *G06K 19/073* | (2006.01) |

(52) U.S. Cl.
CPC ....... *G06Q 20/4016* (2013.01); *G06K 19/045* (2013.01); *G06K 19/0704* (2013.01); *G06K 19/07354* (2013.01)

(58) Field of Classification Search
CPC ............. G06K 19/045; G06K 19/0704; G06K 19/07354
See application file for complete search history.

(56) References Cited

U.S. PATENT DOCUMENTS

| | | | | |
|---|---|---|---|---|
| 8,870,075 | B2* | 10/2014 | Sabbah | G06K 19/07345 340/572.1 |
| 11,361,207 | B1* | 6/2022 | Black | G06K 19/07363 |
| 2006/0289657 | A1* | 12/2006 | Rosenberg | G06K 19/07345 235/492 |
| 2007/0220273 | A1* | 9/2007 | Campisi | G06Q 20/3574 713/186 |
| 2008/0126260 | A1* | 5/2008 | Cox | G06Q 20/3552 705/67 |
| 2008/0156885 | A1* | 7/2008 | Landau | G06K 19/0702 235/492 |
| 2008/0256642 | A1* | 10/2008 | Hachey | H04W 12/122 455/410 |

(Continued)

*Primary Examiner* — Daniel I Walsh
(74) *Attorney, Agent, or Firm* — Weiss & Arons LLP (57) ABSTRACT

A contactless secure transaction card is provided. The transaction card can include an integrated circuit and an auxiliary battery power authentication system. The card can further include a touch screen for receiving a biometrically recognizable user finger depression, a magnetic strip including transaction card information and a plurality of antenna coils. The coils receive inductive power from the NFC reader and transmit, and receive, communications signals to, and from, the NFC reader, respectively. The card may also include an auxiliary battery power authentication system including a memory circuit for storing at least one biometric characteristic associated with the finger depression, an authentication circuit. The authentication circuit verifies, in response to receiving the finger depression, the at least one biometric characteristic associated with the finger depression, and an auxiliary power system powers the memory circuit and the authentication circuit independent of the inductive power received from the NFC reader.

4 Claims, 4 Drawing Sheets

(56) References Cited

U.S. PATENT DOCUMENTS

| | | | |
|---|---|---|---|
| 2009/0045960 A1* | 2/2009 | von Gutfeld | G07F 7/0866 340/572.3 |
| 2011/0140841 A1* | 6/2011 | Bona | G06K 19/06196 340/5.83 |
| 2011/0140888 A1* | 6/2011 | Stone | B42D 15/022 340/540 |
| 2011/0266350 A1* | 11/2011 | Chapman | H04L 9/32 235/487 |
| 2012/0200389 A1* | 8/2012 | Solomon | G06Q 20/40145 340/5.52 |
| 2014/0035720 A1* | 2/2014 | Chapman | B42D 25/00 235/488 |
| 2014/0108241 A1* | 4/2014 | Tunnell | G06Q 20/321 705/41 |
| 2015/0206148 A1* | 7/2015 | Cherry | G06F 21/35 705/41 |
| 2017/0032231 A1* | 2/2017 | Chapman | G06K 19/07327 |
| 2017/0289127 A1* | 10/2017 | Hendrick | H04W 12/065 |
| 2017/0293342 A1* | 10/2017 | Field | G06F 1/26 |
| 2017/0300799 A1* | 10/2017 | Breed | G06K 19/0718 |
| 2018/0129831 A1* | 5/2018 | Yokoi | G06K 19/0701 |
| 2018/0247042 A1* | 8/2018 | Schuster | G06F 21/34 |
| 2018/0276519 A1* | 9/2018 | Benkley, III | G06F 21/45 |
| 2019/0026740 A1* | 1/2019 | Davenport | G06Q 20/4018 |
| 2019/0065919 A1* | 2/2019 | Maheshwari | G06K 19/0718 |
| 2019/0392436 A1* | 12/2019 | Lee | G06V 40/1306 |
| 2020/0311509 A1* | 10/2020 | Benkley, III | G06F 21/32 |
| 2021/0133529 A1* | 5/2021 | Yeap | G06K 19/0772 |
| 2021/0272098 A1* | 9/2021 | Delsuc | G06Q 20/341 |
| 2022/0230037 A1* | 7/2022 | Roessner | G07F 7/0833 |
| 2023/0098452 A1* | 3/2023 | Park | G06F 21/32 713/186 |
| 2023/0162191 A1* | 5/2023 | Valencia | G06Q 20/389 705/69 |
| 2023/0259734 A1* | 8/2023 | Katano | B42D 25/305 235/492 |
| 2024/0013222 A1* | 1/2024 | Riyaz | G07F 7/1008 |
| 2024/0185220 A1* | 6/2024 | Agarwal | G06Q 20/3572 |

* cited by examiner

AUXILIARY BATTERY POWER AUTHENTICATION SYSTEM FOR USE WITH AN EMV CONTACTLESS SECURE TRANSACTION CARD

FIELD OF TECHNOLOGY

Aspects of the disclosure relate to EMV contactless payment cards.

BACKGROUND OF THE DISCLOSURE

This application addresses lack of security and the relatively high probability of fraudulent transaction via contactless cards As contactless plastic cards with integrated circuits (i.e., chips) (Credit, Debit, Benefits, Health, FSA, HSA etc.) are becoming more popular, the probability of fraud associated with such cards has increased. This is at least because the card antenna typically transmits in the vicinity of any activation device. Security of the card data may be at risk because of the following, common, scenarios.

It is not uncommon for many customers to cluster in the vicinity of activation devices (long queues in shops, peak holiday season, etc.). This cluster can cause most cards to transmit substantially at the same time.

Also, multiple cards in the wallet of same individual can create a cluster effect of transmitting at inappropriate times. Because cards transmit in the vicinity of a Near Field Communication (NFC) reader associated with a Point of Sale (POS) devices, and because of the probability of an individual having more than one card in wallet is high, other cards may start transmitting simultaneously to a card needed for the purchase. This card cluster creates a cluttered environment which may be a security risk, or just a confusion risk, of card data. Such a confusion risk may cause a wrongful card payment.

In addition, because of an induction effect associated with card antennas, the cards can trigger additional, and uncalled for, warnings, on security systems at airports, office buildings, etc.

Fraud chances are high as the antenna can undesirably transmit if an activation device from a hacker is nearby—i.e., one can easily skim the data from chip unbeknownst to the card owner.

It would be desirable to improve the security of the contactless plastic card data.

It would be further desirable to improve the security of the contactless plastic card data by reducing inappropriate card data transmission and skimming of data.

SUMMARY OF THE DISCLOSURE

It is an object of the invention to improve the security of the contactless plastic card data.

It is a further object of the invention to improve the security of the contactless plastic card data by reducing inappropriate card data transmission and skimming of data.

The disclosure is directed to controlling the auto transmission of payments and/or connectivity to EMV by introducing a physical circuit gap that relies on human contact to close the circuit gap and avail transaction.

Certain embodiments may involve a transmission coil that interacts with human touch and pass on electromagnetic waves to light up, or otherwise complete, the circuit in response to a touch in order to interact with the EMV. Preferably, the touch triggers the automatic connection.

Based on proximity of the EMV contactless reader, such as an NFC reader, the in-built antenna may preferably be powered by inductive current. Once powered, the EMV card may interact with the NFC reader to complete the transaction.

Systems and methods according to the invention reduce the chances of fraud as well as unintentional payments that may occur automatically due to lack of security in conventional EMV transactions and other circumstances currently extant in the digital world.

Introduction of human involvement/touch to close the circuit gap and interact with EMV reader instead of automatic reading to all cards that are within the vicinity enables higher security, reduces confusion and preferably reduce fraudulent transactions.

A unique transmission coil that closes the circuit gap upon human touch and completes the antenna to interact with EMV instead of automatic connectivity is provided.

An auxiliary battery power authentication system for use with a contactless secure transaction card is provided. The transaction card includes an integrated circuit for being powered by, and communicating with, a Near Field Communications (NFC) reader. The transaction card also includes a touch screen for receiving a biometrically recognizable user finger depression, a magnetic strip including transaction card relevant information, and a plurality of antenna coils. The coils are configured for receiving inductive power from the NFC reader and for receiving communications signals from the NFC reader. The auxiliary battery power authentication system is adapted for use with a contactless secure transaction card. The auxiliary battery power authentication system further includes a memory circuit for storing at least one biometric characteristic associated with the finger depression, an authentication circuit comprising one or more processors, the authentication circuit for verifying, in response to the finger depression, the at least one biometric characteristic associated with the finger depression and an auxiliary power system for powering the memory circuit and the authentication circuit independent of the inductive power received from the NFC reader.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

A contactless secure transaction card is provided. The transaction card may include an integrated circuit and an auxiliary battery power authentication system. The contactless secure transaction card may be primarily powered by, and for communicating with, a Near Field Communications (NFC) reader. The contactless secure transaction card may further include a touch screen for receiving a biometrically recognizable user finger depression, a magnetic strip including transaction card information and a plurality of antenna coils. The coils may be configured to receive inductive power from the NFC reader and to transmit, and receive, communications signals to, and from, the NFC reader, respectively. The contactless secure transaction card may further include an auxiliary battery power authentication system. The auxiliary battery power authentication system may include a memory circuit for storing at least one biometric characteristic associated with the finger depression and an authentication circuit including one or more processors. The authentication circuit may be configured to verify, in response to receiving the finger depression, the at least one biometric characteristic associated with the finger depression. The auxiliary battery power authentication system may also include an auxiliary power system for powering the memory circuit and the authentication circuit independent of the inductive power received from the NFC reader.

The auxiliary battery power authentication system may further include a solar cell. The solar cell may be configured for charging the auxiliary power system. The solar cell may be configured for charging a battery associated with the auxiliary power system. The authentication circuit may form part of the integrated circuit. The integrated circuit may be powered by the auxiliary power system.

In some embodiments a magnetic strip may form a part of the memory circuit.

In certain embodiments, following authentication of the at least one biometric characteristic by the authentication circuit, the auxiliary batter power authentication system may be deactivated.

Some embodiments of the invention may include a contactless secure transaction card. The transaction card may include an integrated circuit for being powered by, and communicating with, a Near Field Communications (NFC) reader. The transaction card may include a plurality of antenna coils. The coils may be configured for receiving inductive power from the NFC reader and for receiving communications signals from the NFC reader. There may exist a physical gap in the coils. The physical gap may be configured for receiving a user finger depression. When the gap is open, the plurality of coils presents an open circuit—and neither power nor communications can be received from the NFC reader. When the gap is closed by a user's digit, then the plurality of coils forms a closed circuit. The closed circuit may be configured to receive inductive power from the NFC reader. This inductive power powers the integrated circuit. The closed circuit may also provide an antenna for exchanging communication with the NFC reader.

Figure 1:
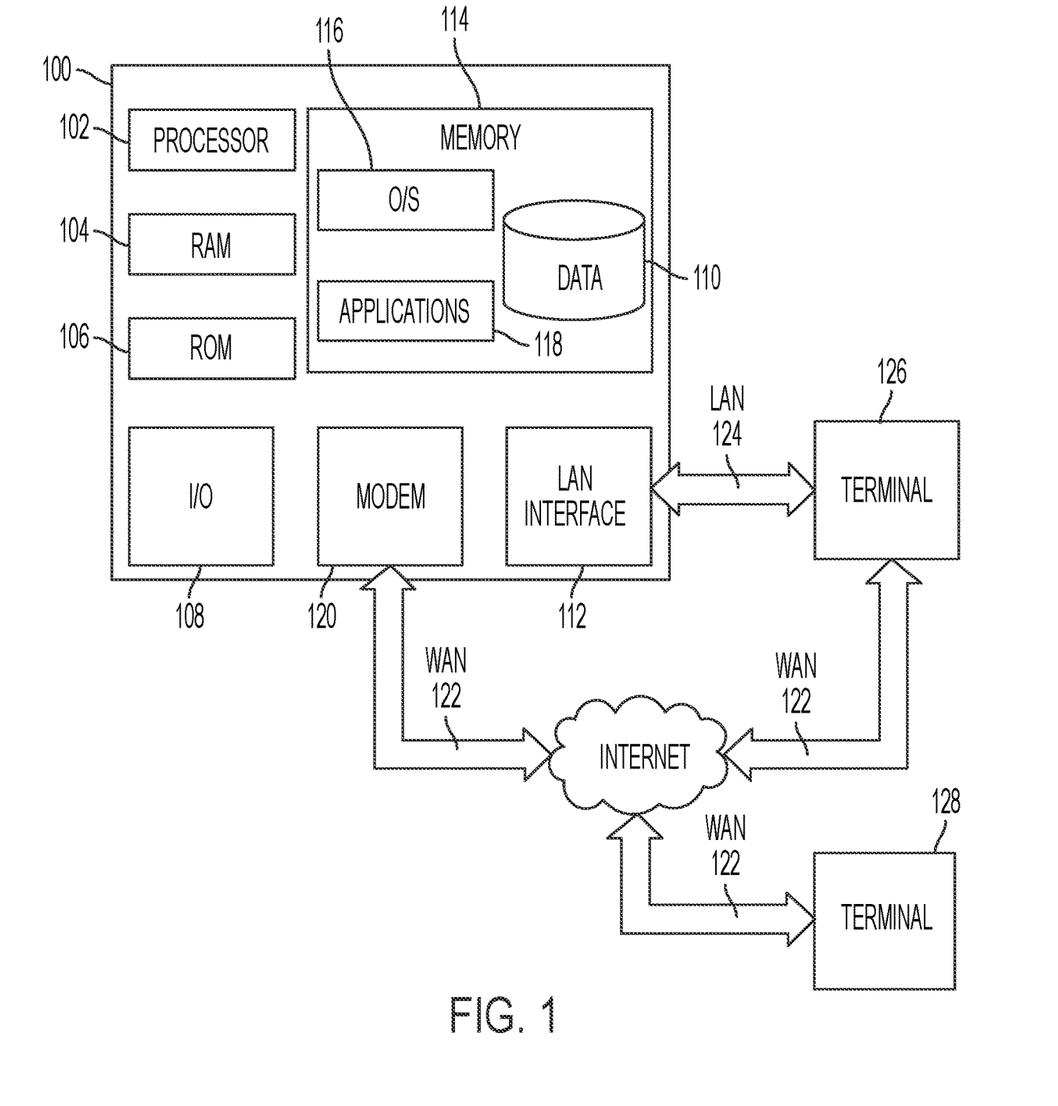
FIG. 1 shows an illustrative diagram in accordance with principles of the disclosure.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of communications involving Artificial Intelligence (AI) as detailed herein.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
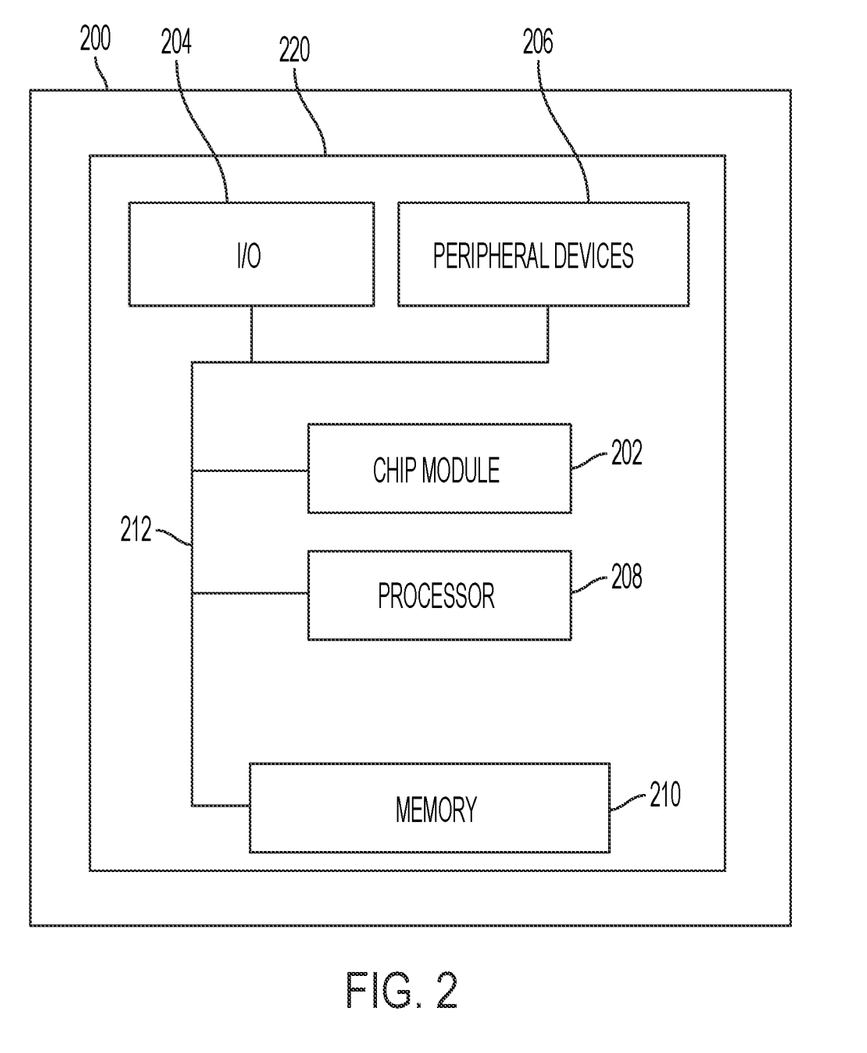
FIG. 2 shows another illustrative diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
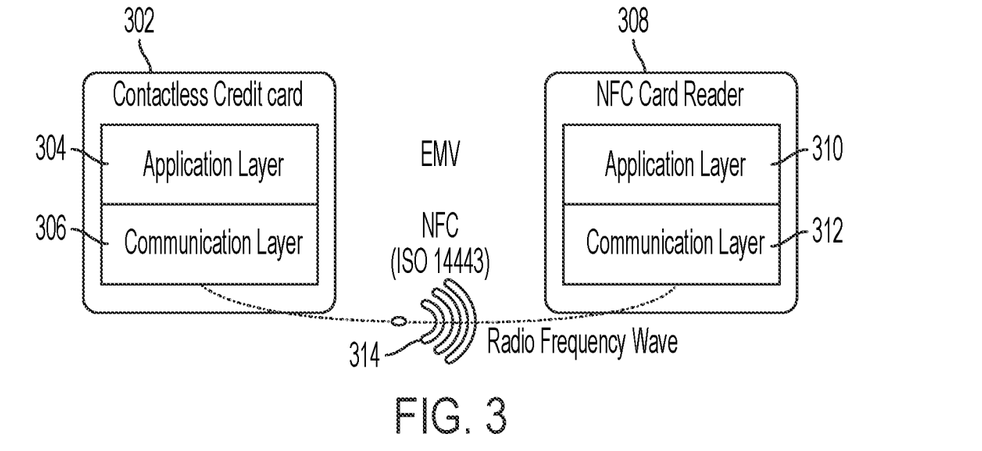
FIG. 3 shows a schematic diagram of a system involving a contactless payment card.

FIG. 3 shows a schematic diagram of a system involving a contactless payment card 302 and a near-field communication (NFC) card reader 308.

Contactless payment card 302 may include an application layer 304. Contactless payment card 302 may include a communications layer 306.

Communications layer 306 may be operated by application layer to communicate with NFC card reader 308.

Preferably, communications between communications layer 306 and NFC card reader 308 may be conducted under a suitable contactless standard such as a suitable NFC standard (International Standards Organization (ISO) 14443).

On the NFC card reader 308 side—the communications between contactless payment card 302 and NFC card reader 308 may preferably be conducted between communications layer 312 and contactless payment card 302. The operation of communications layer 312 may preferably be controlled by application layer 310.

Figure 4:
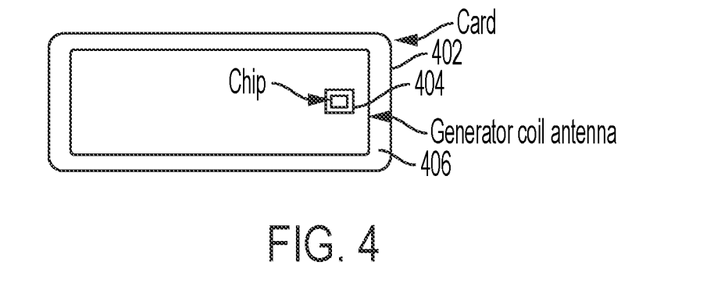
FIG. 4 shows a schematic diagram of an inductive circuit located internal to a contactless payment card.

FIG. 4 shows a schematic diagram of an inductive circuit located internal to a contactless payment card 402. The inductive circuit includes chip 404 and generator coils/antenna 406. It should be noted that generator coils/antenna 406 are typically formed from loops of copper (or other suitable) wire. These wire loops serve as a combination generator coil and data antenna. When contactless payment card 402 comes within a threshold proximity of an NFC reader (see, e.g., FIG. 3), generator coils/antenna 406 may come within a radio frequency (RF) field generated by the NFC reader.

Initially, the payment card's 402 power to drive chip 404 is generated from energy transferred from the reader by generating an RF field and inducing an electrical current in the generator coils/antenna 406. Thereafter, the field may transfer power via generator coils/antenna 406 to chip 404 on contactless payment card 402. Once chip 404 is powered, generator coils/antenna 406 may further serve to enable communication of data between chip 404 and the NFC reader. In an EMV contactless card, generator coils/antenna 406 may preferably contact chip 404 via two contact points (as opposed to a contact smart card, which normally has five contact points.) As mentioned above, data transfer to and from contactless smart cards is managed by ISO 14443-compliant protocols. The realistic physical distance limit on the exchange of data between contactless smart cards and an NFC reader is in the range of 2-4 inches.

Figure 5:
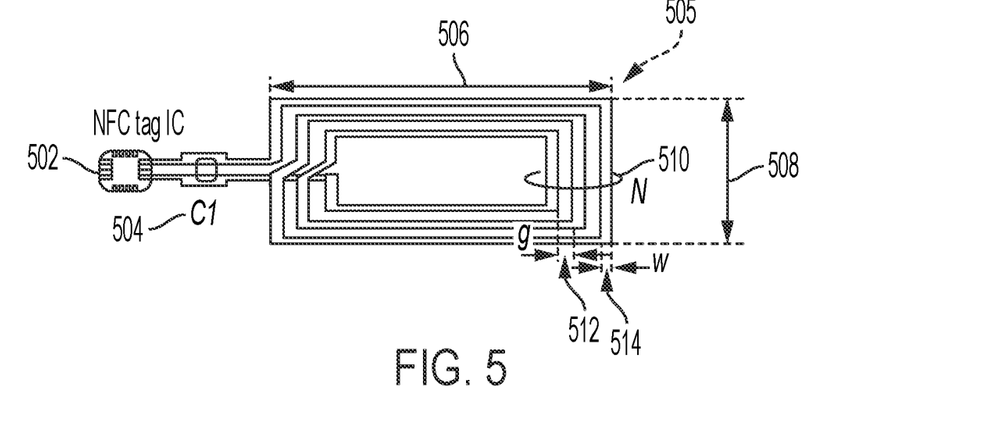
FIG. 5 shows a schematic diagram of schematic diagram of an inductive circuit for coupling to a chip.

FIG. 5 shows another schematic diagram of schematic diagram of an inductive circuit for coupling to a chip 502 located within a contactless payment card. FIG. 5 details some of the physical characteristics associated with such a circuit. More importantly, FIG. 5 indicates that these physical characteristics affect the operation, and consequently the physical distance limit of communication between the contactless smart cards and an NFC reader, of the communication between contactless smart cards and the NFC reader.

FIG. 5 shows an NFC tag Integrated Circuit (IC) 502, a capacitor coupling IC 502 to generator coils/antenna 505. Generator coils/antenna 505 preferably include the following characteristics: length 506 of outermost coil, width 508 of outermost coil, number of coils 510, gap 512 between two adjoining coils, and width 514 of a wire forming the coils. It should be noted that each of these characteristics will typically affect the power of the signal induction received by the circuit, as well as the ability to receive data—i.e., the functioning of the circuit as an antenna—from the NFC.

Figure 6:
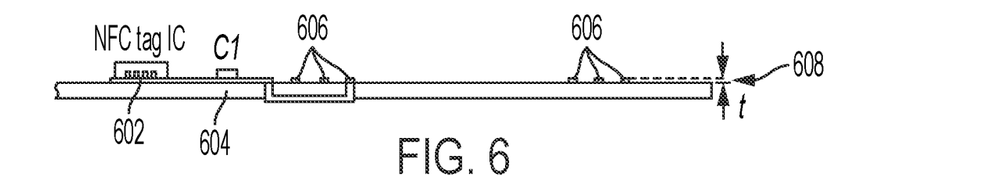
FIG. 6 shows a schematic diagram of a side view of an inductive circuit for coupling to a chip.

FIG. 6 shows a schematic diagram of a side view of an inductive circuit for coupling to a chip 602 located within a contactless payment card. The circuit includes a capacitor 604 and coils 606. It should be noted that the thickness of coils 606 is shown at 608. The thickness of coils 606 will also affect the strength of the inductive power generated by coils 606, as well as the functioning of the coils as an antenna.

Figure 7:
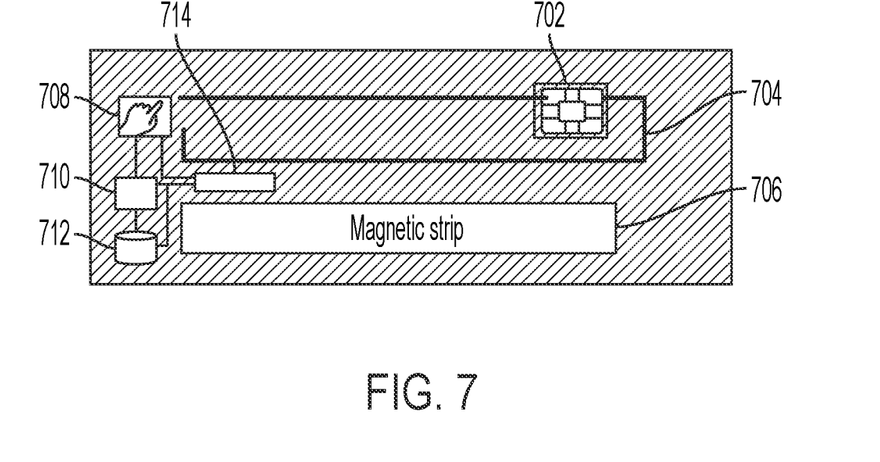
FIG. 7 shows a top plan view of a proposed contactless secure plastic transaction card according to the embodiments.

FIG. 7 shows a top plan view of a proposed contactless secure plastic transaction card according to the embodiments. The proposed contactless secure transaction card preferably includes an integrated circuit (chip) 702 for interfacing with an NFC reader (not shown), an antenna with a gap 704, a magnetic strip 706 and a touchscreen 708. It should be noted that, while a touchscreen 708 is shown, any suitable capacitive, or other type of, circuit that can convert a human touch into a closing of the circuit formed by antenna 704. Whenever the circuit is closed—e.g., by application of the finger to the gap or touch screen that bridges a capacitive, or other, gap—the circuit preferably is in condition to receive inductive power and, once turned on, to act as an antenna to receive wireless signals, such as radio frequency, or other, signals. Whenever the gap is closed using the finger touch, then, based at least in part on the proximity of the NFC reader, the antenna will have induced power, which will, in turn, enable the card to communicate with the NFC reader. This relationship preferably increases the security, and reduces the signal clutter, associated with legacy devices.

It should be noted that a gap associated with touch screen 708, or other gap, may be coupled to an authentication circuit 710 and/or a memory circuit 712. It should be noted that, in some embodiments of the authentication circuit, a card-mounted battery 714 may be mounted on the card. This may preferably enable the contactless chip to provide its own power for authentication independent of having to energize the induction circuit. Such an auxiliary battery could preferably be powered by a solar cell disposed on the battery (not shown) or other charging method. Accordingly, the embodiments set forth herein could preferably save on the energy required to power the card during the authentication stage.

In other embodiments, an authentication circuit may be located on the card but coupled to the IC 702. In yet other embodiments, the authentication circuit may be located remotely from the card—i.e., at a remote server—and may be leveraged as a gatekeeper to operate the card. Authorization may involve verifying certain biometric characteristics as is known in the art of touch screens.

Touchscreens have used a variety of techniques over the last two decades to detect the placement of a finger on a screen ranging from mechanical, optical, and electrical sensing. Today's capacitive electrical touchscreens have proven to be the most versatile and efficient way to sense human touch. A capacitor is an electrical circuit that, in its simplest form, is composed of two conductive electrodes separated by an insulating gap. A direct current (DC) of electricity cannot straddle this gap, but an alternating current (AC) can induce a charge to flow from one side to the other. The surface of a touchscreen is blanketed with a grid of electrodes. Wherever our finger comes to rest, a capacitive contact is formed and the AC current generated within the device induces a corresponding current within our body which helps span the gap and complete the circuit.

It is known that fingers, or other digits or body parts, may be used to close an electrical circuit. In fact, such circuits can be leveraged to detect human touch with high fidelity.

It should be noted that for a finger to bridge the circuit gap, there has to be a return electrical path. As such, it follows that a finger or other digit can be used to close the gap on the circuit set forth herein.

In some embodiments, a suitable touchscreen may be positioned on a handheld device, such as a smartphone, to be interposed in the gap in the circuit. In such embodiments, the finger can close the gap by touching, or hovering over, the touch screen. Thus, the touch screen and/or associated physical gap bifurcates the circuit in such a way as to enable the finger to play a part in the circuit.

In the embodiments in which the touch screen bifurcates the circuit, the touch screen can be leveraged, through additional suitable digital memory and circuitry, to provide biometric authentication to the touchscreen. Accordingly, these embodiments provide a touch screen that will preferably only work for a pre-defined user, and/or in response to a pre-defined biometric signal. The pre-defined biometric may be used to complete the electrical loop set forth by the antenna. Once the loop is completed by the pre-defined biometric, the loop is electrically grounded. It should be noted that in some embodiments the ground effect can use some part of the body, at least because the body is likely in contact with an electrical ground. It is almost guaranteed that humans (or their fingers of other suitable digits) can close an electrical loop for capacitive screens—such as is found in touch screens.

It is common that at every electrode on a touchscreen grid lies an embedded microcontroller that has a clock-speed of nanoseconds. It is this fast response time that enables smartphones according to the present disclosure to have such smooth interaction with human touch. The current disclosure seeks to take advantage of this quick speed in order to enable a user to quickly and easily use a transaction card to obtain a secure and speedy transaction without having to access power from an inductive coupling with an NFC reader.

As mentioned above, capacitive sensing can be utilized to perform as the leading sensor used in transaction card systems to detect the identity and/or characteristics of their users. In certain embodiments, this can be based on a kind of imaging that uses electric fields.

Thus, systems and methods for providing enhanced security features in an AUXILIARY BATTERY POWERED AUTHENTICATION SYSTEM FOR USE WITH AN EMV CONTACTLESS SECURE TRANSACTION CARD. Persons skilled in the art will appreciate that the present invention can be practiced by other than the described embodiments, which are presented for purposes of illustration rather than of limitation. The present invention is limited only by the claims that follow.

What is claimed is:

1. A method for providing auxiliary start-up battery power to a contactless secure transaction card, the transaction card comprising an integrated circuit for being inductively powered by, and communicating with, a Near Field Communications (NFC) reader, a card-mounted auxiliary power system for powering the transaction card, a touch screen, and a solar battery, the method comprising:

using the card-mounted auxiliary power system to power a memory circuit and to power the touch screen;

receiving on the touch screen, said touch screen located within a physical circuit gap in a transmission coil, a biometrically-recognizable user finger contact;

storing, in the memory circuit, at least one baseline biometric characteristic associated with the user finger contact;

in response to receiving the biometrically-recognizable user finger contact, physically bridging the physical circuit gap within the transmission coil;

in response to bridging the physical circuit gap with the user finger contact:

conducting a signal with the user finger contact;

using the transmission coil that interacts with a human touch of the user finger contact to pass on electromagnetic waves to complete the integrated circuit; and communicating, using power derived from the solar battery upon completion of the transmission coil, with a remote authentication circuit to compare the baseline biometric characteristic with the user finger contact, said remote authentication circuit located remote from the transaction card, said remote authentication circuit operating as a gatekeeper for transactions involving the transaction card, the remote authentication circuit comprising one or more processors, the remote authentication circuit verifying the user finger contact;

in response to verifying the biometrically-recognizable user finger contact at the remote authentication circuit, using a transmission coil that interacts with the human touch to pass on electromagnetic waves to complete the integrated circuit to execute one or more transactions with the transaction card; and in response to a determination by the remote authentication circuit that the finger depression matches the user finger contact based on a match between the baseline biometric characteristic and the user finger contact, terminating operation of the auxiliary power system and the solar battery and completing a transaction via the NFC communication with an in-range NFC reader that provides power for the card through induction with the coil.

2. The method for providing auxiliary start-up battery power to a contactless secure transaction card of claim 1 further comprising charging the auxiliary power system using a solar cell.

3. The method for providing auxiliary start-up battery power to a contactless secure transaction card of claim 1 further comprising using a card-mounted solar cell to charge a battery associated with the auxiliary power system.

4. The method for providing auxiliary start-up battery power to a contactless secure transaction card of claim 1, wherein following authentication of the baseline biometric characteristic by the authentication circuit, the authentication circuit is deactivated.

* * * * *